United States Patent
Zhu et al.

(10) Patent No.: US 11,968,729 B2
(45) Date of Patent: Apr. 23, 2024

(54) METHOD AND APPARATUS FOR ALLOCATING PDU SESSION ID FOR TERMINAL DEVICE

(71) Applicant: Telefonaktiebolaget LM Ericsson (publ), Stockholm (SE)

(72) Inventors: Jinyin Zhu, Shanghai (CN); Juying Gan, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 324 days.

(21) Appl. No.: 17/613,254

(22) PCT Filed: Dec. 27, 2019

(86) PCT No.: PCT/CN2019/129208
§ 371 (c)(1),
(2) Date: Nov. 22, 2021

(87) PCT Pub. No.: WO2020/248579
PCT Pub. Date: Dec. 17, 2020

(65) Prior Publication Data
US 2022/0225441 A1   Jul. 14, 2022

(30) Foreign Application Priority Data
Jun. 14, 2019  (WO) ................ PCT/CN2019/091348

(51) Int. Cl.
*H04W 76/11* (2018.01)
(52) U.S. Cl.
CPC ................... *H04W 76/11* (2018.02)
(58) Field of Classification Search
None
See application file for complete search history.

(56) References Cited

U.S. PATENT DOCUMENTS

2017/0339609 A1*  11/2017  Youn ................ H04W 76/11
2019/0037618 A1*   1/2019  Yang ................ H04L 69/22
(Continued)

FOREIGN PATENT DOCUMENTS

CN    108370600 A    8/2018
CN    108738082 A   11/2018
(Continued)

OTHER PUBLICATIONS

"3GPP TS 23.501 V16.0.2", 3rd Generation Partnership Project; Technical Specification Group Services and System Aspects; System Architecture for the 5G System; Stage 2 (Release 16), Apr. 2019, pp. 1-317.
(Continued)

*Primary Examiner* — Phuoc H Nguyen
(74) *Attorney, Agent, or Firm* — Murphy, Bilak & Homiller, PLLC (57) ABSTRACT

Embodiments of the present disclosure relate to a method and an apparatus for allocating a PDU session ID for a terminal device. The method comprises: selecting (S101), for a terminal device, a protocol data unit session identity, PDU session ID, from a group of PDU session IDs. The group of PDU session IDs are not allocated to the terminal device. According to the embodiments of the present disclosure, the network node may select, for the terminal device, a PDU session ID from a group of PDU session IDs, which are not allocated to the terminal device yet. Thus, any newly selected PDU session ID may be ensured as unique.

20 Claims, 4 Drawing Sheets

(56) References Cited

U.S. PATENT DOCUMENTS

| | | | |
|---|---|---|---|
| 2019/0150219 A1 | 5/2019 | Wang et al. | |
| 2019/0364420 A1* | 11/2019 | Rommer | H04W 12/033 |
| 2020/0169951 A1* | 5/2020 | Cai | H04W 4/24 |
| 2020/0178076 A1* | 6/2020 | Ben Henda | H04L 63/12 |
| 2020/0280843 A1* | 9/2020 | Foti | H04W 36/14 |
| 2020/0383033 A1* | 12/2020 | Foti | H04W 76/16 |
| 2021/0144592 A1* | 5/2021 | Vikberg | H04W 36/125 |
| 2021/0282167 A1* | 9/2021 | Wang | H04L 5/0044 |
| 2021/0360742 A1* | 11/2021 | Liao | H04W 28/09 |
| 2022/0150690 A1* | 5/2022 | Yang | H04W 8/20 |

FOREIGN PATENT DOCUMENTS

| | | |
|---|---|---|
| CN | 109673174 B | 8/2021 |
| RU | 2546611 C2 | 4/2015 |
| WO | 2011003195 A2 | 1/2011 |
| WO | 2018084795 A1 | 5/2018 |
| WO | 2019011398 A1 | 1/2019 |

OTHER PUBLICATIONS

"3GPP TS 24.007 V16.0.0", 3rd Generation Partnership Project; Technical Specification Group Core Network and Terminals; Mobile radio interface signalling layer 3; General aspects (Release 16), Mar. 2019, pp. 1-155.

"3GPP TS 24.501 V16.0.2", 3rd Generation Partnership Project; Mar. 2019, pp. 1-480.

"3GPP TS 29.571 V15.3.0", 3rd Generation Partnership Project; Technical Specification Group Core Network and Terminals; 5G System; Common Data Types for Service Based Interfaces; Stage 3 (Release 15), Mar. 2019, pp. 1-73.

"Comparison of the options for session ID allocation and routing of subsequent SM signalling", SA WG2 Meeting #118; S2-167000, Reno, Nevada, USA, Nov. 14-18, 2016, pp. 1-9.

"Interim agreement on MM-SM interaction", SA WG2 Meeting #S2-118, S2-166478, Reno, Nevada, USA, Nov. 14-18, 2016, pp. 1-7.

"3GPP TS 23.502 V16.0.2", 3rd Generation Partnership Project; Technical Specification Group Services and System Aspects; Procedures for the 5G System; Stage 2 (Release 16), Apr. 2019, pp. 1-290.

"Serving 4G only UEs by SMF+PGW-C", 3GPP TSG SA WG2 Meeting #133 S2,-1905387, Reno, Nevada, USA, May 13-17, 2019, pp. 1-7.

"5G SM transport—alternative 1—clean up", 3GPP TSG-CT WG1 Meeting #105, C1-172799, Krakow (Poland), Aug. 21-25, 2017, pp. 1-13.

"Serving 4G only UEs by SMF+PGW-C", 3GPP TSG SA WG2 Meeting #133, S2-1906779, Reno, Nevada, USA (was 6437, 6429, 5065), May 13-17, 2019, pp. 1-2.

"Serving 4G only UEs by SMF+PGW-C", 3GPP TSG SA WG2 Meeting #133, S2-1905386, Reno, Nevada, USA, May 13-17, 2019, pp. 1-8.

* cited by examiner

METHOD AND APPARATUS FOR ALLOCATING PDU SESSION ID FOR TERMINAL DEVICE

TECHNICAL FIELD

The present disclosure relates generally to the technology of communication system, and in particular, to a method and an apparatus for allocating a protocol data unit session identity, PDU session ID, for a terminal device.

BACKGROUND

This section introduces aspects that may facilitate better understanding of the present disclosure. Accordingly, the statements of this section are to be read in this light and are not to be understood as admissions about what is in the prior art or what is not in the prior art.

In a $5^{th}$ generation (communication) system, 5GS, a compatibility capability is provided for serving different types of terminal devices supporting different access modes/networks. For example, a terminal device supporting the $5^{th}$ generation core non access stratum, 5GC NAS, may request the 5GS to establish a PDU session and obtains a PDU session ID for the established PDU session.

Alternatively, a terminal device not supporting the 5GC NAS (e.g. a terminal device only supporting $4^{th}$ generation, 4G) may request the 5GS to establish a packet data network connection, PDN connection. A combined PDN gateway control plane and session management function, PGW-C+SMF may be selected for establishing the PDN connection.

In the communication system, it is also desired to create, or allocate a unique PDU Session ID for the PDN connection, since a PDU session ID is mandatory when communicating with some 5G core network nodes, such as unified data management, UDM, policy control function, PCF, etc. However, no specific method or apparatus is currently provided to create or allocate a PDU session ID for a terminal device not supporting 5GC NAS.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Namely, according to embodiments of the present disclosure, a specific method or apparatus is provided to create or allocate a PDU session ID for a terminal device not supporting 5GC NAS. Further, an uncontrolled system behavior due to duplicated PDU Session IDs allocated for the same terminal device may be avoid, particularly when the terminal device accesses the communication network from Evolved Packet Core/evolved Packet Data Gateway, EPC/ePDG (i.e. untrusted Wireless Local Area Network, WLAN) and from EPS, or when both the terminal device and the PGW-C+SMF generate PDU session IDs for the terminal device (e.g. due to a N1 mode capability change of the terminal).

A first aspect of the present disclosure provides a method performed at a network node, comprising: selecting, for a terminal device, a protocol data unit session identity, PDU session ID, from a group of PDU session IDs. The group of PDU session IDs are not allocated to the terminal device.

In embodiments of the present disclosure, the group of PDU session IDs are not selectable by the terminal device.

In embodiments of the present disclosure, a PDU session ID selectable by the terminal device is any of 1 to 15.

In embodiments of the present disclosure, the network node obtains an evolved packet system bearer identity, EPS Bearer ID, associated to the terminal device, from a mobility management entity, MME or an evolved packet data network gateway, ePDG. The network node selects the PDU session ID, based on the EPS Bearer ID.

In embodiments of the present disclosure, the PDU session ID has a first mapping relationship to the EPS Bearer ID if the EPS Bearer ID is obtained from the MME; and the PDU session ID has a second mapping relationship to the EPS Bearer ID if the EPS Bearer ID is obtained from the ePDG.

In embodiments of the present disclosure, the first mapping relationship includes adding a first value to the EPS Bearer ID to obtain the PDU session ID; and the second mapping relationship includes adding a second value to the EPS Bearer ID to obtain the PDU session ID.

In embodiments of the present disclosure, the first value is determined as $n1*m1$, n1 is a first positive integer, m1 is a positive integer equal to or more than 15; and the second value is determined as $n2*m2$, n2 is a second positive integer, m2 is a positive integer equal to or more than 15.

In embodiments of the present disclosure, the first value may be 64. The second value may be 80.

In embodiments of the present disclosure, the method further comprises: retrieving, from a data management node, at least one PDU Session ID already used for the terminal device; and determining the group of PDU session IDs not allocated to the terminal device, based on the at least one PDU Session ID already used for the terminal device.

In embodiments of the present disclosure, the data management node is a unified data management, UDM.

In embodiments of the present disclosure, the terminal device is configured not to support a 5th generation access network, at least temporarily.

In embodiments of the present disclosure, the network node is a combination of packet data network gateway control plane and session management node, PGW-C+SMF.

A second aspect of the present disclosure provides an apparatus for a network node, comprising: a processor; and a memory, containing instructions executable by the processor. The network node is operative to implement the method according to any of embodiments in the first aspect.

A third aspect of the present disclosure provides a computer readable storage medium having a computer program stored thereon. The computer program is executable by apparatus to cause the apparatus to carry out the method according to any of embodiments in the first aspect.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "function", "node", "network node" or "network side node" refers to a network device/apparatus/entity with accessing capability in a communication network via which a terminal device accesses to the network and receives services therefrom. The node/function may include a base station (BS), an access point (AP), a multi-cell/multicast coordination entity (MCE), a server node/function (such as a service capability server/application server, SCS/AS, group communication service application server, GCS AS, application function, AF), an exposure node (such as a service capability exposure function, SCEF, network exposure function, NEF), a unified data management, UDM, a session management function, SMF, an access and mobility management function, AMF, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" encompasses a device which is able to communicate with a network node/network function, such as a base station, or with another wireless device by transmitting and/or receiving wireless signals. Thus, the term terminal device encompasses, but is not limited to: a mobile phone, a stationary or mobile wireless device for machine-to-machine communication, an integrated or embedded wireless card, an externally plugged in wireless card, a vehicle, etc.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g.

refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 1:
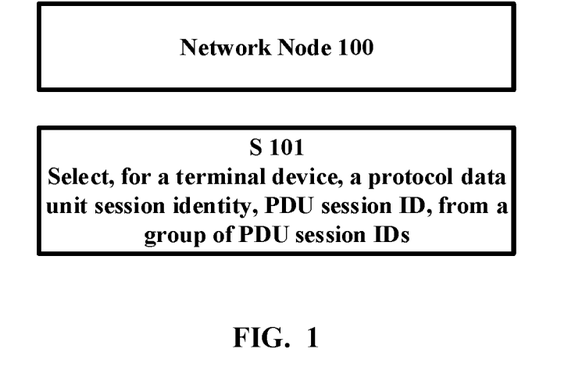
FIG. 1 is an exemplary flow chart showing a method performed at a network node for allocating a PDU session ID for a terminal device, according to embodiments of the present disclosure.

FIG. 1 is an exemplary flow chart showing a method performed at a network node for allocating a PDU session ID for a terminal device, according to embodiments of the present disclosure.

As shown in FIG. 1, the method performed at a network node 100 includes: S101, selecting, for a terminal device, a protocol data unit session identity, PDU session ID, from a group of PDU session IDs. The group of PDU session IDs are not allocated to the terminal device.

The network node 100 may create or allocate a PDU session ID for the terminal device not supporting 5GC NAS (i.e. not supporting N1 mode as defined in a $3^{rd}$ generation partnership project technical specification, 3GPP TS 24.501 v16.0.2). Therefore, the terminal device needs not to process (e.g. created, obtain, store, process) the PDU session ID, namely, the terminal device not supporting 5GC NAS needs not to be updated for the purpose using PDU session ID.

Further, according to embodiments of the present disclosure, the network node 100 selects, for the terminal device, a PDU session ID from a group of PDU session IDs, which are not allocated to the terminal device yet. Thus, any newly selected PDU session ID may be ensured as unique. An uncontrolled system behavior due to duplicated PDU Session IDs allocated for the same terminal device may be avoid, particularly when the terminal device accesses the communication network from Evolved Packet Core/evolved Packet Data Gateway, EPC/ePDG (i.e. untrusted Wireless Local Area Network, WLAN) and from EPS, or when both the terminal device and the PGW-C+SMF generate PDU session IDs for the terminal device (e.g. due to a N1 mode capability change of the terminal).

In embodiments of the present disclosure, the terminal device is configured not to support a 5th generation access network, at least temporarily.

In embodiments of the present disclosure, the group of PDU session IDs are not selectable by the terminal device.

For example, the terminal device may temporarily not support the 5GC NAS, and then temporarily support the 5GC NAS. Such N1 mode capability of the terminal device, such as a user equipment, UE, may be changed (e.g. due to a UE usage setting change), when the UE has already attached in the network with active PDN connections. In such situation, there will be confliction of the PDU Session ID between PDN connections created before N1 mode capability change and PDN connections created after N1 mode capability change because the UE is not aware what PDU Session ID(s) have been assigned by the PGW-C+SMF and vice versa. For example, when the N1 mode capability is OFF, the PGW-C+SMF may assign a first PDU session ID for (a PDN connection of) the UE. Then, after the N1 mode capability changes from OFF to ON, the UE may request to establish a PDU session, and select a second PDU session ID for the established PDU session. It will be possible the first PDU session is the same with the second PDU session, since the UE is not aware of the first PDU session ID already assigned. Then confliction exists.

According to embodiments of the present disclosure, the network node 100 selects, for the terminal device, a PDU session ID from the group of PDU session IDs, which are not selectable by the terminal device. Therefore, no conflict will exist even the N1 mode capability of the terminal device is changed between ON and OFF.

In embodiments of the present disclosure, a PDU session ID selectable by the terminal device is any of 1 to 15. Therefore, the network node 100 will selects from other PDU session IDs.

Particularly, 3GPP TS24.007 V16.0.0 defines the PDU Session ID as bellow.

TABLE 11.2.3.1c.1

PDU session identity
PDU session identity value (octet 1, bit 1 to bit 8)

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 0 | No PDU session identity assigned |
| 0 | 0 | 0 | 0 | 0 | 0 | 0 | 1 | PDU session identity value 1 |
| 0 | 0 | 0 | 0 | 0 | 0 | 1 | 0 | PDU session identity value 2 |
| 0 | 0 | 0 | 0 | 0 | 0 | 1 | 1 | PDU session identity value 3 |
| 0 | 0 | 0 | 0 | 0 | 1 | 0 | 0 | PDU session identity value 4 |
| 0 | 0 | 0 | 0 | 0 | 1 | 0 | 1 | PDU session identity value 5 |
| 0 | 0 | 0 | 0 | 0 | 1 | 1 | 0 | PDU session identity value 6 |
| 0 | 0 | 0 | 0 | 0 | 1 | 1 | 1 | PDU session identity value 7 |
| 0 | 0 | 0 | 0 | 1 | 0 | 0 | 0 | PDU session identity value 8 |
| 0 | 0 | 0 | 0 | 1 | 0 | 0 | 1 | PDU session identity value 9 |
| 0 | 0 | 0 | 0 | 1 | 0 | 1 | 0 | PDU session identity value 10 |
| 0 | 0 | 0 | 0 | 1 | 0 | 1 | 1 | PDU session identity value 11 |
| 0 | 0 | 0 | 0 | 1 | 1 | 0 | 0 | PDU session identity value 12 |
| 0 | 0 | 0 | 0 | 1 | 1 | 0 | 1 | PDU session identity value 13 |
| 0 | 0 | 0 | 0 | 1 | 1 | 1 | 0 | PDU session identity value 14 |
| 0 | 0 | 0 | 0 | 1 | 1 | 1 | 1 | PDU session identity value 15 |

All other values are reserved.

Further, 3GPP TS 29.571 V15.3.0 defines description about the PDU session ID as below.

TABLE 5.4.2-1

Simple Data Types

| Type Name | Type Definition | Description |
|---|---|---|
| Applications | string | String providing an application identifier. |
| ApplicationIdRm | string | This data type is defined in the same way as the "ApplicationId" data type, but with the OpenAPI "nullable: true" property. |

TABLE 5.4.2-1-continued

Simple Data Types

| Type Name | Type Definition | Description |
|---|---|---|
| PduSessionId | integer | Unsigned integer identifying a PDU session, within the range 0 to 255, as specified in subclause 11.2.3.1b, bits 1 to 8, of 3GPP TS 24.007 [13]. |

According to embodiments of the present disclosure, the network node 100 may select, for the terminal device, the PDU session ID from the range of 16 to 255.

In embodiments of the present disclosure, the network node obtains an evolved packet system bearer identity, EPS Bearer ID, associated to the terminal device, from a mobility management entity, MME or an evolved packet data network gateway, ePDG. The network node selects the PDU session ID, based on the EPS Bearer ID.

A range of an evolved packet system bearer identity, EPS Bearer ID (EBI), associated to the terminal device the terminal device is from 1 to 15, which is the same as PDU Session ID range above mentioned. It will be convenient for the network node 100 to create a PDU Session ID based on EBI.

In embodiments of the present disclosure, the PDU session ID has a first mapping relationship to the EPS Bearer ID if the EPS Bearer ID is obtained from the MME; and the PDU session ID has a second mapping relationship to the EPS Bearer ID if the EPS Bearer ID is obtained from the ePDG.

One problem about EBI is that it is difficult for the network node 100 to create a unique PDU Session ID based on EBI when UE is camping on both 3GPP and non-3GPP access (i.e., both ePDG and MME are serving the UE).

According to embodiments of the present disclosure, a first mapping relationship is used if the EPS Bearer ID is obtained from the MME, and a second mapping relationship is used if the EPS Bearer ID is obtained from the ePDG. Even the UE is camping on both 3GPP and non-3GPP access, the selected PDU session ID is ensured as unique.

In embodiments of the present disclosure, the first mapping relationship includes adding a first value to the EPS Bearer ID to obtain the PDU session ID; and the second mapping relationship includes adding a second value to the EPS Bearer ID to obtain the PDU session ID.

In embodiments of the present disclosure, the first value is determined as $n1*m1$, $n1$ is a first positive integer, $m1$ is a positive integer equal to or more than 15; and the second value is determined as $n2*m2$, $n2$ is a second positive integer, $m2$ is a positive integer equal to or more than 15.

For example, the current PDU Session ID range may be extended from 1-15 to a range of 1-47. If the PDN connection is initially established from MME, and the PDU Session is not received from the UE, the PGW-C+SMF sets the PDU Session ID to be EBI+16 (i.e. 1*16); if the PDN connection is initially established from ePDG and the PDU Session is not received from the UE, the PGW-C+SMF sets the PDU Session ID to be EBI+32 (i.e. 2*16). In this example, $n1=1$, $m1=16$, and $n2=2$, $m2=16$. However, these values are only exemplary but not limitations. Any other positive integers (namely, any of 1, 2, 3, 4, 5, 6 . . . ) may be selected for the $n1$, and $n2$. For example, when $n1=4$, $m1=16$, and $n2=5$, $m2=16$, if the PDN connection is initially established from MME, the PGW-C+SMF sets the PDU Session ID to be EBI+64 (i.e. 4*16); if the PDN connection is initially established from ePDG, the PGW-C+SMF sets the PDU Session ID to be EBI+80 (i.e. 5*16).

The selection of specific values for $n1$, $n2$, $m1$, $m2$ are not limited, as long as the network node selects, for the terminal device, a PDU session ID, from a group of PDU session IDs, which are not selectable by the terminal device itself.

For example, the current PDU Session ID range may be extended from 1-15 to a range of 1-45. If the PDN connection is initially established from MME, and the PDU Session is not received from the UE, the PGW-C+SMF sets the PDU Session ID to be EBI+15 (i.e. 1*15); if the PDN connection is initially established from ePDG and the PDU Session is not received from the UE, the PGW-C+SMF sets the PDU Session ID to be EBI+30 (i.e. 2*15). In this example, $n1=1$, $m1=15$, and $n2=2$, $m2=15$.

Further, all network functions/nodes which handle PDU Session ID may also be improved to support the extended values.

Particularly, the PDU session identity definition in 3GPP TS24.007 V16.0.0 may be updated as below (update in bold and underlined font).

TABLE 11.2.3.1c.1

PDU session identity
PDU session identity value (octet 1, bit 1 to bit 8)

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 0 | No PDU session identity assigned |
| 0 | 0 | 0 | 0 | 0 | 0 | 0 | 1 | PDU session identity value 1 |
| 0 | 0 | 0 | 0 | 0 | 0 | 1 | 0 | PDU session identity value 2 |
| 0 | 0 | 0 | 0 | 0 | 0 | 1 | 1 | PDU session identity value 3 |
| 0 | 0 | 0 | 0 | 0 | 1 | 0 | 0 | PDU session identity value 4 |
| 0 | 0 | 0 | 0 | 0 | 1 | 0 | 1 | PDU session identity value 5 |
| 0 | 0 | 0 | 0 | 0 | 1 | 1 | 0 | PDU session identity value 6 |
| 0 | 0 | 0 | 0 | 0 | 1 | 1 | 1 | PDU session identity value 7 |
| 0 | 0 | 0 | 0 | 1 | 0 | 0 | 0 | PDU session identity value 8 |
| 0 | 0 | 0 | 0 | 1 | 0 | 0 | 1 | PDU session identity value 9 |
| 0 | 0 | 0 | 0 | 1 | 0 | 1 | 0 | PDU session identity value 10 |
| 0 | 0 | 0 | 0 | 1 | 0 | 1 | 1 | PDU session identity value 11 |

TABLE 11.2.3.1c.1-continued

PDU session identity
PDU session identity value (octet 1, bit 1 to bit 8)

| | | | Bits | | | | | |
|---|---|---|---|---|---|---|---|---|
| 8 | 7 | 6 | 5 | 4 | 3 | 2 | 1 | |
| 0 | 0 | 0 | 0 | 1 | 1 | 0 | 0 | PDU session identity value 12 |
| 0 | 0 | 0 | 0 | 1 | 1 | 0 | 1 | PDU session identity value 13 |
| 0 | 0 | 0 | 0 | 1 | 1 | 1 | 0 | PDU session identity value 14 |
| 0 | 0 | 0 | 0 | 1 | 1 | 1 | 1 | PDU session identity value 15 |
| 0 | 0 | 0 | 1 | 0 | 0 | 0 | 0 | PDU session identity value 16(new) |
| ... | ... | ... | ... | ... | | | | |
| 0 | 0 | 0 | 1 | 1 | 1 | 1 | 1 | PDU session identity value 31(new) |
| 0 | 0 | 1 | 0 | 0 | 0 | 0 | 0 | PDU session identity value 32(new) |
| ... | ... | ... | ... | ... | ... | ... | ... | |
| 0 | 0 | 1 | 0 | 1 | 1 | 1 | 1 | PDU session identity value 47 (new) |

All other values are reserved.
Value from 0 to 15 are used by UE generated PDU Session ID.
Value from 16 to 47 are only used for PGW-C + SMF generated PDU Session ID and within these values, 16 to 31 are used for the PDN connection initially established in EPS and 32 to 47 are used for PDN connection initially established in EPC/ePDG.

Further, the PduSessionId definition in 3GPP TS29.571 V15.3.0 may be updated as below (update in bold and underlined font).

TABLE 5.4.2-1

Simple Data Types

| Type Name | Type Definition | Description |
|---|---|---|
| Applications | string | String providing an application identifier. |
| ApplicationIdRm | string | This data type is defined in the same way as the "ApplicationId" data type, but with the OpenAPI "nullable: true" property. |
| PduSessionId | integer | Unsigned integer identifying a PDU session, within the range 0 to 255. For PDU Session ID generated by UE, this is as specified in subclause 11.2.3.1b. bits 1 to 8, of 3GPP TS 24.007 [13]; for PDU Session ID generated by PGW-C + SMF, the value is from 16 to 47 and with in this range, 16 to 31 is used for PDN connection initially established over EPS and 32 to 47 is used for PDN connection initially established over EPC/ePDG. |

According to embodiments of the present disclosure, the PDU session ID is selected by the network node 100, based on EBI, and the selected PDU session ID is ensured as unique.

Figure 2:
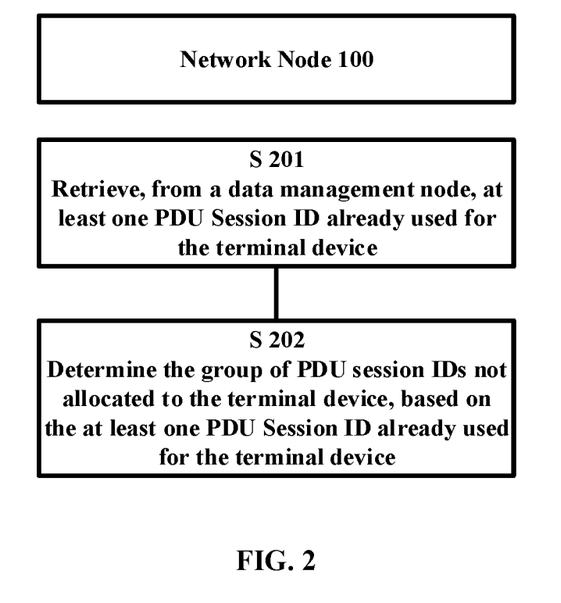
FIG. 2 is an exemplary flow chart showing other steps in the method as shown in FIG. 1, according to embodiments of the present disclosure.

FIG. 2 is an exemplary flow chart showing other steps in the method as shown in FIG. 1, according to embodiments of the present disclosure.

In embodiments of the present disclosure, the method further comprises: S201, retrieving, from a data management node, at least one PDU Session ID already used for the terminal device; and S202, determining the group of PDU session IDs not allocated to the terminal device, based on the at least one PDU Session ID already used for the terminal device.

According to embodiments of the present disclosure, the network node can select a PDU Session ID to be any value other than ones being used, no matter the current PDU session IDs are extended or not.

Figure 3:
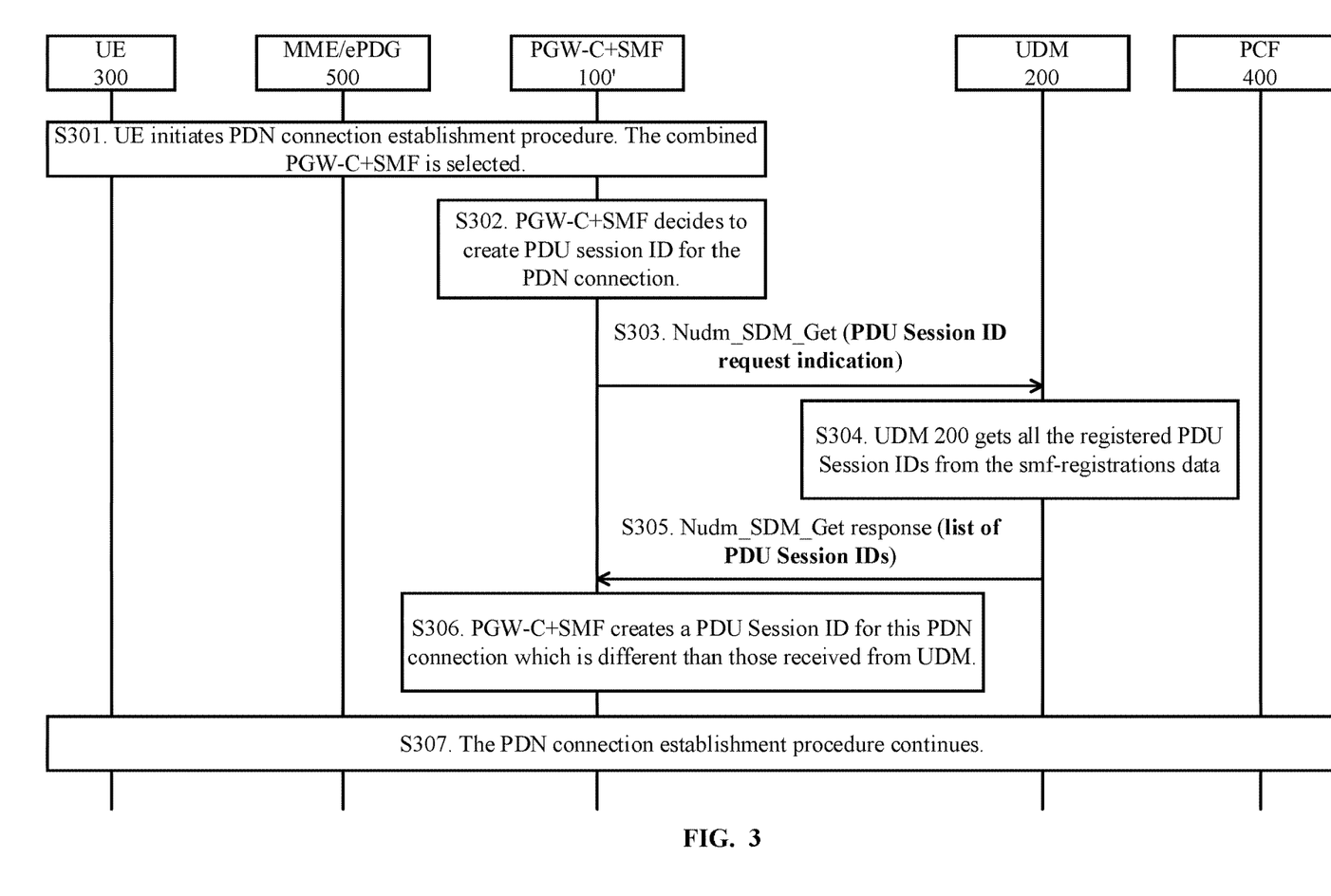
FIG. 3 is an exemplary diagram showing more detailed procedures for the method as shown in FIG. 2, according to embodiments of the present disclosure.

FIG. 3 is an exemplary diagram showing more detailed procedures for the method as shown in FIG. 2, according to embodiments of the present disclosure.

In embodiments of the present disclosure, the data management node may be a unified data management, UDM, 200.

In embodiments of the present disclosure, the network node 100 may be a combination of packet data network gateway control plane and session management node, PGW-C+SMF, 100'.

In step S301, a 4G only UE 300 initiates PDN connection establishment procedure. The selected PGW-C for the PDN connection is combined with SMF. Since the UE 300 does not support 5GC NAS, no PDU Session ID is included in (extended) Protocol Configuration Options, (e)PCO, in the PDN Connectivity Request message.

In step S302, the PGW-C+SMF 100' decides to use UDM 200, policy control function, PCF, 400 and other service based interface (SBI) based network functions for this PDN connection and PDU Session ID needs to be created.

In step S303, the PGW-C+SMF 100' sends Nudm_SDM_Get to UDM 200 to retrieve the subscription data and in the message, PDU Session ID request indication is included to request UDM 200 to provide all the PDU Session IDs allocated for the UE 300.

In step S304, UDM 200 gets all the registered PDU Session IDs from the smf-registrations data.

In step S305, UDM 200 responds the Nudm_SDM_Get and in the message, a list of used PDU Session IDs is included.

In step S306, the PGW-C+SMF 100' creates a new PDU Session ID for this PDN connection which is different from the already allocated PDU Session ID.

In step S307, the PDN connection establishment procedure continues, other function/node, such as MME/ePDG 500 may be involved.

According to embodiments of the present disclosure, when PGW-C+SMF 100' retrieves the subscription data from UDM 200 using Nudm_SDM_Get, UDM sends in the response message all the PDU Session IDs already been allocated for the UE. With these procedures, PGW-C+SMF 100' can set PDU Session ID to be any value other than ones being used, no matter the current PDU session IDs are extended or not.

Therefore, it works to select combined PGW-C+SMF 100' for UE 300 not supporting 5GC NAS and use SBI based network functions to serve the PDN connection of the UE 300.

Figure 4:
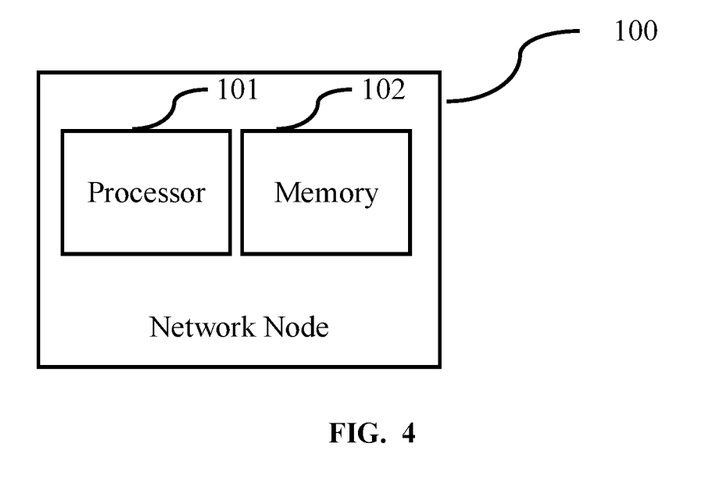
FIG. 4 is a block diagram showing apparatuses for the network node, according to embodiments of the present disclosure.

FIG. 4 is a block diagram showing apparatuses for the network node, according to embodiments of the present disclosure.

As shown in FIG. 4, an apparatus for a network node 100, comprising: a processor 101; and a memory 102, containing instructions executable by the processor 101. The network node 100 is operative to implement the method according to any of embodiments above mentioned.

For example, the network node 100 is operative to select, for a terminal device, a protocol data unit session identity, PDU session ID, from a group of PDU session IDs. The group of PDU session IDs are not allocated to the terminal device.

Further, the network node 100 is operative to methods as shown in FIG. 2 or FIG. 3.

According to embodiments of the present disclosure, the network node 100 selects, for the terminal device, a PDU session ID from a group of PDU session IDs, which are not allocated to the terminal device yet. Thus, any newly selected PDU session ID may be ensured as unique.

The processors 101 may be any kind of processing component, such as one or more microprocessor or microcontrollers, as well as other digital hardware, which may include digital signal processors (DSPs), special-purpose digital logic, and the like. The memories 102 may be any kind of storage component, such as read-only memory (ROM), random-access memory, cache memory, flash memory devices, optical storage devices, etc.

Figure 5:
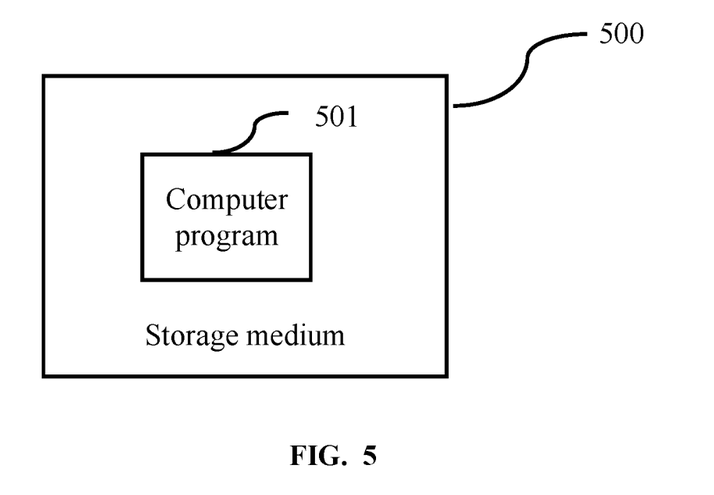
FIG. 5 is a block diagram showing a computer readable storage medium, according to embodiments of the present disclosure.

FIG. 5 is a block diagram showing a computer readable storage medium, according to embodiments of the present disclosure.

As shown in FIG. 5, a computer readable storage medium 500 having a computer program 501 stored thereon. The computer program 501 is executable by apparatus to cause the apparatus to carry out the method according to any of embodiments of the present disclosure, such as methods shown in FIG. 1, FIG. 2, and FIG. 3.

The computer readable storage medium 500 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

Figure 6:
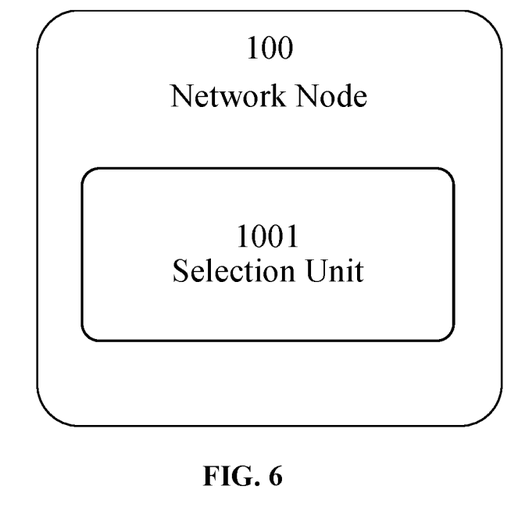
FIG. 6 is a schematic showing units of the apparatus for the network node, according to embodiments of the present disclosure.

FIG. 6 is a schematic showing units of the apparatus for the network node, according to embodiments of the present disclosure.

As shown in FIG. 6, the network node 100 may comprise a selection unit 1001, configured to select, for a terminal device, a protocol data unit session identity, PDU session ID, from a group of PDU session IDs. The group of PDU session IDs are not allocated to the terminal device.

The apparatus for an application function, AF, 100 is further operative to any of the methods above mentioned, such as methods shown in FIG. 2, and FIG. 3.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the network node 100 may not need a fixed processor or memory, any computing resource and storage resource may be arranged from at least one network node/device/entity/apparatus in the communication system. The virtualization technology and network computing technology may be further introduced, so as to improve the usage efficiency of the network resources and the flexibility of the network.

According to embodiments of the present disclosure, a specific method or apparatus is provided to create or allocate a PDU session ID for a terminal device not supporting 5GC NAS. The network node may select, for the terminal device, a PDU session ID from a group of PDU session IDs, which are not allocated to the terminal device yet. Thus, any newly selected PDU session ID may be ensured as unique.

Further, according to embodiments of the present disclosure, the network node 100 selects, for the terminal device, a PDU session ID from the group of PDU session IDs, which are not selectable by the terminal device. Therefore, no conflict will exist even the N1 mode capability of the terminal device is changed between ON and OFF.

Further, according to embodiments of the present disclosure, the network node 100 may select, for the terminal device, the PDU session ID from the range of 16 to 255.

Further, according to embodiments of the present disclosure, the PDU session ID is selected by the network node 100, based on EBI, and the selected PDU session ID is ensured as unique. Particularly, according to embodiments of the present disclosure, a first mapping relationship is used if the EPS Bearer ID is obtained from the MME, and a second mapping relationship is used if the EPS Bearer ID is obtained from the ePDG. Even the UE is camping on both 3GPP and non-3GPP access, the selected PDU session ID is ensured as unique.

Further, according to embodiments of the present disclosure, the network node can select a PDU Session ID to be any value other than ones being used, no matter the current PDU session IDs are extended or not.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method performed at a network node of a communication network, comprising:
obtaining an evolved packet system (EPS) bearer identity (ID), associated with a terminal device, from a mobility management entity (MME) or an evolved packet data network gateway (ePDG) of the communication network; and
selecting, for the terminal device, a particular protocol data unit (PDU) session ID from a group of PDU session IDs that are not allocated to the terminal device by the communication network, wherein the particular PDU session ID is selected based on the EPS Bearer ID and the following:
a first mapping relationship to the EPS Bearer ID when the EPS Bearer ID is obtained from the MME; and
a second mapping relationship to the EPS Bearer ID when the EPS Bearer ID is obtained from the ePDG.

2. The method according to claim 1, wherein the group of PDU session IDs, from which the particular PDU session ID is selected by the network node, exclude PDU session IDs that are selectable by the terminal device.

3. The method according to claim 2, wherein the PDU session IDs that are selectable by the terminal device include any of integers 1 to 15.

4. The method according to claim 1, wherein:
the first mapping relationship includes adding a first value to the EPS Bearer ID to obtain the PDU session ID; and
the second mapping relationship includes adding a second value to the EPS Bearer ID to obtain the PDU session ID.

5. The method according to claim 4, wherein:
the first value is determined as $n1*m1$, where $n1$ is a first positive integer and $m1$ is a positive integer equal to or more than 15; and
the second value is determined as $n2*m2$, where $n2$ is a second positive integer and $m2$ is a positive integer equal to or more than 15.

6. The method according to claim 4, wherein the first value is 64 and the second value is 80.

7. The method according to claim 1, further comprising:
retrieving, from a data management node of the communication network, at least one PDU Session ID already used for the terminal device; and
determining the group of PDU session IDs not allocated to the terminal device, based on the at least one PDU Session ID already used for the terminal device.

8. The method according to claim 7, wherein the data management node is a unified data management (UDM).

9. The method according to claim 1, wherein selecting the particular PDU session ID is further based on the terminal device not supporting a $5^{th}$ generation (5G) access network, at least temporarily.

10. The method according to claim 1, wherein the network node comprises a packet data network gateway control plane and session management node (PGW-C+SMF).

11. A network node of a communication network, comprising:
a processor; and
a memory containing instructions executable by the processor, wherein execution of the instructions configures the network node to:
obtain an evolved packet system (EPS) bearer identity (ID), associated with a terminal device, from a mobility management entity (MME) or an evolved packet data network gateway (ePDG) of the communication network; and
select, for the terminal device, a particular protocol data unit (PDU) session ID from a group of PDU session IDs that are not allocated to the terminal device by the communication network, wherein the particular PDU session ID is selected based on the EPS Bearer ID and the following:
a first mapping relationship to the EPS Bearer ID when the EPS Bearer ID is obtained from the MME; and
a second mapping relationship to the EPS Bearer ID when the EPS Bearer ID is obtained from the ePDG.

12. The network node of claim 11, wherein the group of PDU session IDs, from which the particular PDU session ID is selected by the network node, exclude PDU session IDs that are selectable by the terminal device.

13. The network node of claim 12, wherein the PDU session IDs that are selectable by the terminal device include any of integers 1 to 15.

14. The network node of claim 11, wherein:
the first mapping relationship includes adding a first value to the EPS Bearer ID to obtain the PDU session ID; and
the second mapping relationship includes adding a second value to the EPS Bearer ID to obtain the PDU session ID.

15. The network node of claim 14, wherein:
the first value is determined as n1*m1, where n1 is a first positive integer and m1 is a positive integer equal to or more than 15; and
the second value is determined as n2*m2, where n2 is a second positive integer and m2 is a positive integer equal to or more than 15.

16. The network node of claim 14, wherein the first value is 64 and the second value is 80.

17. The network node of claim 11, wherein execution of the instructions further configures the network node to:
retrieve, from a data management node of the communication network, at least one PDU Session ID already used for the terminal device; and
determine the group of PDU session IDs not allocated to the terminal device, based on the at least one PDU Session ID already used for the terminal device.

18. The network node of claim 17, wherein the data management node is a unified data management (UDM).

19. The network node of claim 11, wherein execution of the instructions configures the network node to select the particular PDU session ID further based on the terminal device not supporting a $5^{th}$ generation (5G) access network, at least temporarily.

20. The network node of claim 11, wherein the network node comprises a packet data network gateway control plane and session management node (PGW-C+SMF).

\* \* \* \* \*

UNITED STATES PATENT AND TRADEMARK OFFICE
CERTIFICATE OF CORRECTION

Page 1 of 2

PATENT NO. : 11,968,729 B2
APPLICATION NO. : 17/613254
DATED : April 23, 2024
INVENTOR(S) : Zhu et al.

It is certified that error appears in the above-identified patent and that said Letters Patent is hereby corrected as shown below:

In the Drawings

In Fig. 1, Sheet 1 of 4, delete "S 101" and insert -- S101 --, therefor.

In Fig. 2, Sheet 1 of 4, and on the title page, the illustrative print figure, delete "S 201" and insert -- S201 --, therefor.

In Fig. 2, Sheet 1 of 4, and on the title page, the illustrative print figure, delete "S 202" and insert -- S202 --, therefor.

In the Specification

In Column 1, Line 58, delete "avoid," and insert -- avoided, --, therefor.

In Column 5, Line 38, delete "purpose" and insert -- purpose of --, therefor.

In Column 5, Line 46, delete "avoid," and insert -- avoided, --, therefor.

In Column 6, Line 17, delete "the" and insert -- if the --, therefor.

In Column 6, Line 29, delete "selects" and insert -- select --, therefor.

In Column 6, Line 32, delete "bellow." and insert -- below. --, therefor.

In Columns 5 & 6, in TABLE 5.4.2-1, Line 3, delete "Applications" and insert -- ApplicationId --, therefor.

In Columns 9 & 10, in TABLE 5.4.2-1, Line 3, delete "Applications" and insert -- ApplicationId --, therefor.

Signed and Sealed this
Fifth Day of November, 2024

Katherine Kelly Vidal
*Director of the United States Patent and Trademark Office*

In Columns 9 & 10, in TABLE 5.4.2-1, under "Description", Line 8, delete "11.2.3.1b." and insert -- 11.2.3.1b, --, therefor.

In Columns 9 & 10, in TABLE 5.4.2-1, under "Description", Line 11, delete "with in" and insert -- within --, therefor.